United States Patent [19]

La Gasse et al.

[11] Patent Number: 5,022,561
[45] Date of Patent: Jun. 11, 1991

[54] ANTI-THEFT NOZZLE LOCK

[76] Inventors: Russ La Gasse, 12220 Grevillea, Hawthorne, Calif. 90250; Lance Lopez, 24425 Ridgewood Rd., Murrieta, Calif. 92362

[21] Appl. No.: 503,381

[22] Filed: Apr. 2, 1990

[51] Int. Cl.$^5$ .............................................. B67D 5/00
[52] U.S. Cl. ................................... 222/153; 222/568; 285/345; 285/382.7
[58] Field of Search ........................ 222/153, 529, 568; 239/587; 403/320, 362, 365, 366; 285/382.7, 345, 322

[56] References Cited

U.S. PATENT DOCUMENTS

| | | | |
|---|---|---|---|
| 426,205 | 4/1890 | Munsie | 285/55 |
| 968,759 | 8/1910 | Fogg | 292/307 B |
| 1,028,253 | 6/1912 | Murray | 292/317 |
| 1,678,350 | 11/1926 | Ott | 439/797 |
| 1,814,412 | 7/1929 | Rutten | 292/307 B |
| 2,503,738 | 4/1950 | Horton | 403/362 |
| 3,225,974 | 12/1965 | Athas | 222/529 |
| 3,759,423 | 9/1973 | Hansel | 222/153 |
| 3,840,055 | 10/1974 | Wostl et al. | 141/44 |
| 4,079,969 | 3/1978 | Wilson et al. | 285/98 |
| 4,126,335 | 11/1978 | Voss | 285/39 |
| 4,252,458 | 2/1981 | Keen | 403/320 |
| 4,351,375 | 9/1982 | Polson | 141/98 |
| 4,514,109 | 4/1985 | McKenna | 403/365 |
| 4,690,167 | 9/1987 | Skipper | 137/382 |
| 4,826,215 | 5/1989 | Sullivan | 285/80 |

Primary Examiner—Michael S. Huppert
Assistant Examiner—Anthoula Pomrening
Attorney, Agent, or Firm—Freilich Hornbaker Rosen

[57] ABSTRACT

An apparatus is provided for resisting the removal of a fuel dispensing nozzle (12, FIG. 1) from a hose whose front end has a ferrule (16) coupled by a fitting with a nut portion (24) to the nozzle. The apparatus includes a tube (32) large enough in diameter and length to fit around the nut portion of the fitting and the ferrule, and a pair of spacers (36, 38) that lie between the inside of the tube and the ferrule. The spacers form segments of a hollow cylinder whose inside closely matches the outside diameter of the ferrule (16) and whose outside closely matches the inside of the tube (34). Set screws (40) in the tube are tightened against the outside of the spacers, to press the spacers firmly against the outside of the ferrule.

7 Claims, 2 Drawing Sheets

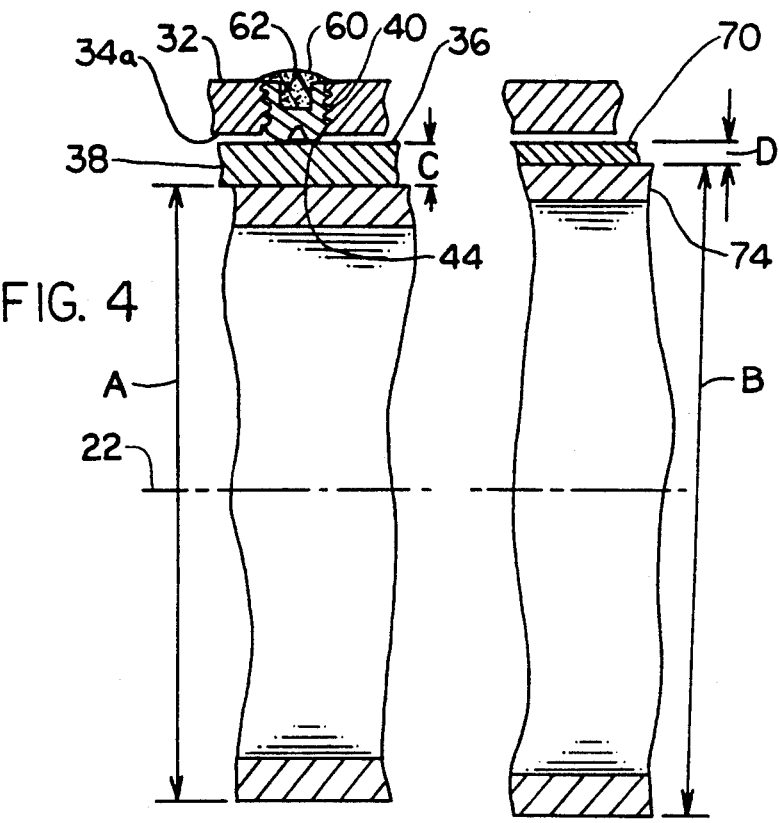
FIG. 4
FIG. 5
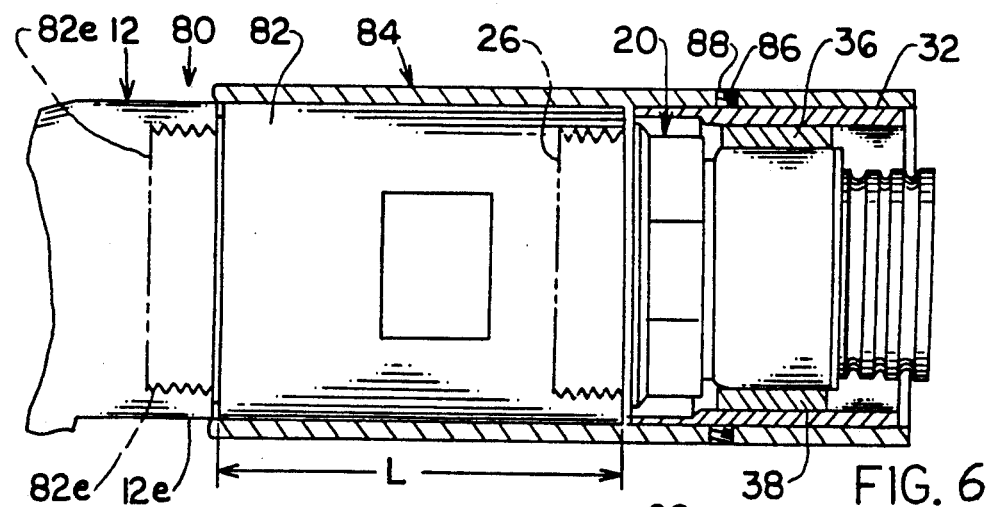
FIG. 6
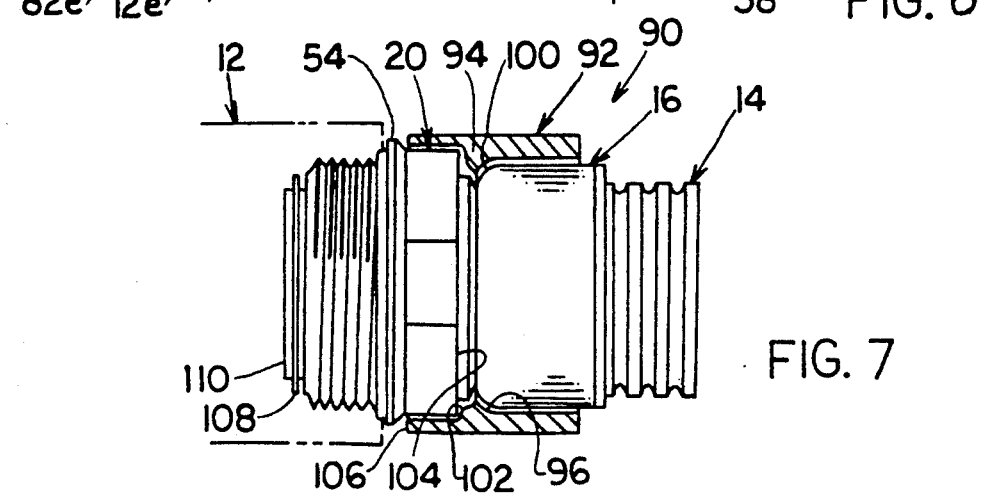
FIG. 7

ANTI-THEFT NOZZLE LOCK

BACKGROUND OF THE INVENTION

Fuel dispensing nozzles used in gas stations are typically connected to hoses by a ferrule fixed to the end of the hose and a fitting which couples the ferrule to the rear end of the nozzle. The fitting is rotatably mounted on the ferrule, has a nut portion that can be grasped by a large wrench to turn the fitting, and has a threaded front end that threads into a hole at the rear of the nozzle. Thieves often drive up to a gas station with a large wrench in hand and unscrew the fittings from the nozzles to steal the nozzles. It may take less than 10 seconds or two to remove each nozzle, and about a minute to remove six nozzles from one island of a gas station. The thieves typically drive off before personnel realize what has happened. Since the cost of modern vapor recovery nozzles is high, it would be desirable to provide a simple, low-cost apparatus for resisting such thefts, but which still allowed personnel at the gas station to easily replace a damaged nozzle.

A straight-forward approach to an anti-theft device is to provide a clamp of the type shown in U.S. Pat. No. 4,826,215 which includes a pair of pivotally-connected halves that can be closed around a coupling and which carry a hasp that can receive an ordinary padlock. However, such device makes the rear of the nozzle, which is often held by customers during dispensing of gasoline, more difficult to hold because of increased bulk and the presence of a protruding hasp and dangling padlock. Also, thieves can carry bolt cutters which can be used to cut a padlock in a few seconds. An anti-theft apparatus which prevented the rapid removal of a gasoline-dispensing nozzle from a hose to discourage theft, but which left a relatively compact and smooth surface at the rear of the dispensing nozzle to avoid interfering with use by customers, and which was of low cost, would be of considerable value.

SUMMARY OF THE INVENTION

In accordance with one embodiment of the present invention, an anti-theft apparatus is provided for resisting the removal of fuel dispensing nozzles from their hoses, which is of low cost and which avoids substantially increased bulk near the rear of the nozzle that could interfere with use of the nozzle by customers. The apparatus includes a tube which is long enough and of sufficient inside diameters to fit around a ferrule attached to the front of the hose and around the nut portion of a fitting which connects the ferrule to the rear of the nozzle. A plurality of spacers lie between the ferrule and tube, with each spacer closely fitting around the ferrule and closely fitting within the inside of the tube. Set screws which thread into the tube, have inner ends that press against the outsides of the segments, to press the segments firmly against the ferrule. The hose adds very little to the bulk of the region at the rear of the nozzle and front of the tube, and the close fitting of the segments to the ferrule avoids rattling and therefore provides a "solid" feel to the installed assembly. The presence of a tube and close fitting segments which are held by set screws, prevents rapid removal of the anti-theft apparatus which greatly discourages theft of the nozzles by thieves who will not steal unless they can accomplish the theft in a short period of time.

Almost all present gas station hoses have ferrules of one of two different sizes. The same tube can be used for either of the sizes by providing two different sizes of spacers, both sizes of spacers having the same outside diameter but different inside diameter. When a nozzle assembly includes a covent valve lying between the rear of the nozzle and the fitting, an additional tube member is provided which extends around both the tube and valve and which is held to the tube by an additional set of set screws that thread into holes in the tube member.

The novel features of the invention are set forth with particularity in the appended claims. The invention will be best understood from the following description when read in conjunction with the accompanying drawings.

BRIEF DESCRIPTION OF THE DRAWINGS

FIG. 4 is a partial enlarged view of a portion of the apparatus of FIG. 2, with an adhesive in the set screw sockets.

FIG. 5 is a partial sectional view somewhat similar to that of FIG. 4, but showing the apparatus used for a tube assembly having a ferrule of greater diameter, and with different spacers.

FIG. 6 is a sectional view of a nozzle and tube assembly which includes a covent valve, and illustrates an additional anti-theft apparatus which can be used in addition to that of FIG. 2.

FIG. 7 is a partial side view of a nozzle and tube assembly and of an anti-theft apparatus of another embodiment of the invention, with the nozzle shown in phantom lines and the anti-theft apparatus shown in section.

DESCRIPTION OF THE PREFERRED EMBODIMENTS

Figure 1:
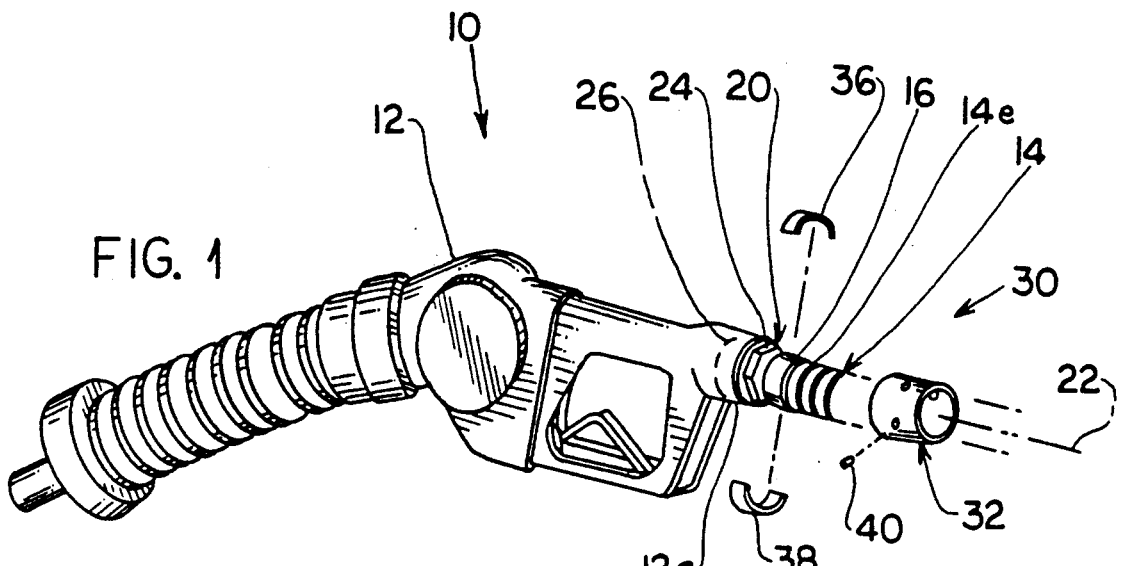
FIG. 1 is a perspective and exploded view of a nozzle and tube assembly, and of the anti-theft apparatus of the present invention.

FIG. 1 illustrates a nozzle and tube assembly 10 of the prior art which includes a fuel dispensing nozzle 12 and a hose 14 that carries gasoline to the nozzle. A ferrule 16 is rigidly fastened to the hose front end 14e. A fitting 20 is rotatably connected to the ferrule 16 to permit rotation of the fitting about the axis 22 of the ferrule. The fitting has a nut portion 24 that can be grasped by a large wrench, and has a forwardly-projecting threaded end 26. The threaded end 26 screws into an internally threaded rear nozzle end 12e. When a nozzle malfunctions, it can be removed by turning the nut portion 24 of the fitting to unscrew the threaded end of the fitting from the nozzle.

There has a been a high rate of theft of nozzles of the vapor recovery type illustrated. A thief commonly drives up to an island of a gas station, where there may be several fuel-dispensing nozzles. The thief quickly applies a wrench to the nut portion 24 of the fitting to unscrew it and steals the nozzle. The operation may take perhaps 10 seconds for each nozzle, and a group of nozzles on the gas station island may be removed in a period such as a minute or two, with the thief quickly driving away. Because of the short time required to remove a nozzle and the fact that a thief may appear to be a customer at a self-service gas pump, gas station attendants may not notice a theft when it is in progress. While it is desirable to provide anti-theft apparatus, it is preferable that such apparatus be of low cost and not create a difficult-to-hold region near the rear 12e of the nozzle, because customers often hold this region when handling the nozzle. It is also desirable that any such anti-theft apparatus not detract from the appearance of the nozzle assembly and not have loose or dangling parts that give the impression that the equipment at the gas station is not of high quality or "solid" with all parts securely fastened.

Figure 2:
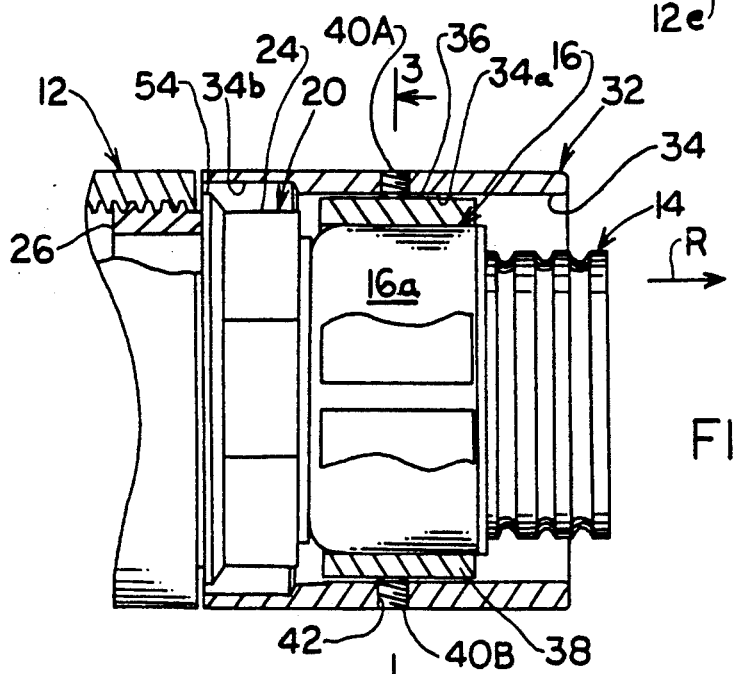
FIG. 2 is a sectional view of a portion of the assembly of FIG. 1, with the anti-theft apparatus in place.

In accordance with the present invention, an anti-theft apparatus 30 is provided which is of relatively simple design and low cost, and which is effective in preventing nozzle thefts that occur during a short period of time. As shown in FIG. 2, the apparatus includes a tube 32 with an inside 34 and length great enough to fit around the nut portion 24 of the fitting and also about the ferrule 16 at the front of the hose. The apparatus also includes a pair of spacers 36, 38 which lie between the inside of the tube 32 and the outside 16a of the ferrule. A group of set screws 40 which includes screws 40A–40D lie in threaded holes 42 formed in the tube at a region thereof which surrounds the ferrule 16 and the spacers 36, 38. The set screws 40 are tightened so their inner ends 44 (FIG. 4) which are the ends closest to the axis 22 of the ferrule, press against the outside of the spacers to press the spacers firmly against the outside of the ferrule.

With the set screws tightened, a thief cannot rapidly remove the nozzle 12. If he holds the outside of the tube 32 from rotating while rotating the nozzle 12, the parts will not separate because the fitting 20 will merely rotate relative to the ferrule 16. This is because, while the tube 32 is tightly clamped (through the spacers) to the ferrule 16, the tube covers the nut portion 24 but is not clamped to it, which allows the nut portion 24 to freely rotate with the nozzle whenever the nozzle 12 is rotated.

In order for a thief to remove the nozzle 12, he must first loosen the four set screws 40A–40D. He must then pull out the tube 32 far enough so he can apply a wrench to the nut portion 24 of the fitting, and then turn the nut portion. The set screws 40 have Allen hexagonal sockets, which requires inserting an Allen or socket wrench into the socket to turn the set screw. In practice, it requires about one-half minute for a thief to apply a socket wrench to each of the four set screws and to turn the set screw sufficiently to loosen them from the spacers 36, 38. As described below, the spacers fit very closely in the tube, and they tend to bind on the tube as the tube is pulled out, so it may require another half minute to wiggle or work the tube rearwardly in the direction of arrow R to withdraw it far enough to expose the nut portion 24 of the fitting, after loosening the set screws. These periods of time and the need to handle both an Allen wrench and a large wrench, make the unobserved theft of nozzles much more difficult for thieves. However, the extra time of perhaps ten minutes required by a worker who is replacing a nozzle (and who does not work in a frenzy as does a thief) is not a significant hindrance to replacement of a damaged nozzle by a legitimate worker. It is noted that Allen wrenches are commonly available in gas stations, and the fact that no key to a lock is required results in the anti-theft apparatus not greatly hampering authorized replacement of a damaged nozzle.

The tube 32 has a cylindrical inside surface portion 34a immediately around the spacers 36, 38, and the ferrule outer surface 16a is cylindrical along most of the region which engages the spacers. Applicant constructs the spacers 36, 38 so their outside and inside surfaces 50, 52 closely match the corresponding adjacent surfaces 34a, 16a of the tube and of the ferrule. As a result, the tube 32 cannot "wobble" appreciably, so the anti-theft apparatus has a "solid" feel rather than being easily wobbled and creating an impression that the apparatus is sloppy. Also, the fact that the tube 32 cannot wobble appreciably prevents persons from moving the tube 32 rearwardly by "working" or repeatedly tilting the tube 32 while urging it rearwardly.

Figure 3:
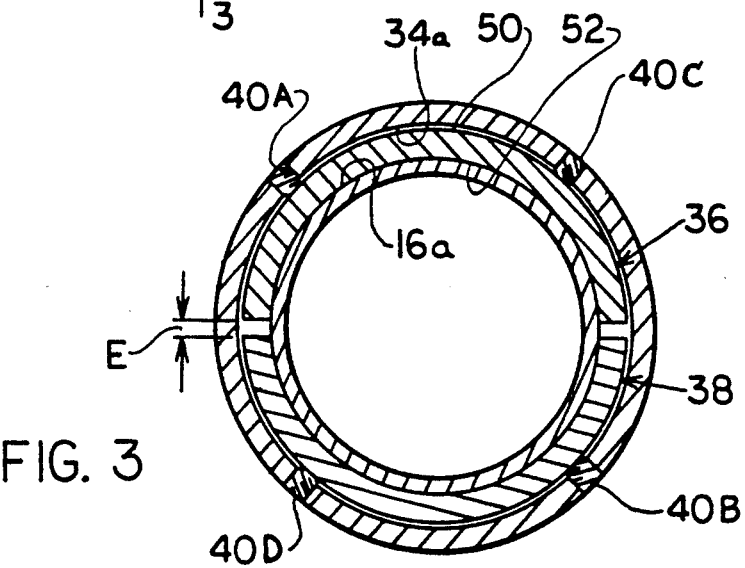
FIG. 3 is a view taken on the line 3—3 of FIG. 2.

The nut portion 24 of the fitting and a more forward ring portion 54 have a greater diameter than the ferrule. The tube has a greater inside diameter at the portion 34b which surrounds the nut portion 24 of the fitting. Since the thin forward portion of the tube does not have to threadably hold set screws, such thinness does not detract from the anti-theft apparatus. As shown in FIG. 3, each spacer 36, 38 extends by an angle of no more than 180° about the axis 22, to allow the spacers to be easily installed and to allow them to be pressed tightly against the ferrule.

While the presence of four set screws that each has to be loosened, and the need to work the tube rearwardly before a person can apply a wrench to the nut portion of the fitting, discourages theft, it would be desirable to further discourage theft by requiring even more time to remove the anti-theft apparatus, while still allowing legitimate workmen to remove it in a reasonable period of time. As shown in FIG. 4, applicant can also apply a quantity 60 of a sealant material such as silicone, to the socket 62 of the set screw 40, to prevent the removal of a set screw by simply inserting an Allen wrench therein. Instead, a person must pick out the silicone adhesive. While the adhesive can be readily picked out, it might require perhaps an additional ten seconds for a thief to pick out the sealant from each set screw socket, and perhaps a couple of minutes for a legitimate worker to pick out the adhesive. The additional time required to pick out the adhesive and the need to carry a picking tool to do so, further hampers theft of the nozzle.

The ferrules coupled to the front end of hoses, come in two standard sizes, with the older Goodyear size and new Thermoid ferrule having an outside diameter A of about 1.70 inches, and the new Goodyear and Dayco ferrules having an outside diameter B (FIG. 5) of 1.80 inches. For the older size A shown in FIG. 4, applicant uses spacers of a thickness C of 0.125 inch. The inside surface portion 34a has a diameter of 2.05 inch, leaving a clearance between the tube 32 and the spacer 30 of about ten-thousandths inch. For the spacers 70, 72 of FIG. 5 which are designed for use with a larger ferrule 74 having an outside diameter B of 1.80 inches, each spacer 70, 72 has a thickness D of 0.075 inch. The spacers 70, 72 have the same outer diameter as the spacers of FIG. 4, and each spacer 70, 72 extends by slightly less than 180° about the axis of the apparatus. Each spacer extends by slightly less than 180°0 to leave gaps E (FIG. 3) of about 0.040 inch between the ends. In practice, the first ends of the spacers may abut one another, and the other ends of the spacers are then separated by about 0.080 inch.

It would be possible to use only the tube 40 but no spacers within it, at least for the larger diameter ferrule 74 of FIG. 5. However, this would result in the set screws 60 being tightened directly against the ferrule, which would result in small circular scratches in the outer surface of the ferrule. Some gasoline station owners do not want to scratch the ferrules, because the ferrules are part of the fairly expensive hoses. By providing spacers between the tube and ferrule, applicant avoids scratching of the ferrule. As described above, the use of the spacers also results in slowing down thieves because the spacers which lie closely within the tube and around the ferrule, prevent rapid removal of the tube after the set screws are loosened.

As indicated in FIG. 1, the anti-theft apparatus 30 is installed by slipping the tube 32, with the set screws not yet in place, or installed but loosened, over the hose 14. The tube 32 is moved forwardly until it abuts the rear of the nozzle and lies around the ferrule 16 and the nut portion 24 of the fitting. Then the spacers such as 36, 38 are installed, from the rear, between the inside of the tube and the outside of the ferrule. This is most easily accomplished by pointing the nozzle 12 downwardly and merely dropping each spacer through the rear end of the tube 32. The inside diameter of the spacers is too small to allow them to move over the nut portion 24 of the fitting, so they drop into the proper place. The set screws 40 are then tightened. If desired, quantities of an adhesive, or sealant, are placed over the sockets of the set screws and allowed to dry.

As shown in FIG. 6, some nozzle and tube assemblies 80 include a covent valve 82 which is installed between the rear end 12e of the nozzle and the threaded front end 26 of the fitting 20. Except for the valve 82, the assembly is the same as that of FIG. 1. Since the valve 82 couples to the nozzle 12 by a threaded front end 82e, and is coupled to the fitting 20 by the threaded front end 26 of the fitting, additional protection must be provided. Applicant provides a tubular member 84 for protection, in addition to the tube 32 and spacers such as 36, 38. The tubular member 84 has a length about equal to the length L of the body of the valve 82 plus the length of the tube 32. The tubular member 84 has a plurality of threaded through holes 86 in a portion thereof that surrounds the tube 32, and has a plurality of set screws 88, such as four of them, to tightly clamp the tubular member 84 to the outside of the tube 32. The tube 32 has set screws that clamp the spacers 36, 38 to the ferrule, in the manner shown in FIG. 2.

FIG. 7 illustrates another anti-theft apparatus 90 which includes a tube 92 having an inwardly-projecting flange 94. The flange has a shoulder 96 that can abut a ferrule shoulder front 100 of the ferrule 16 to limit rearward movement of the tube. The flange forms another shoulder 102 that can abut a rear surface 104 of the fitting; also, the front end 106 of the tube can abut the ring portion 54 of the fitting, with either abutments limiting forward movement of the tube. The tube surrounds the nut portion of the fitting. To remove the hose assembly from the nozzle, a thin pipe wrench is applied to the ring portion 54 of the fitting. With the thin pipe wrench holding the ring portion 54, the nozzle 12 can be turned and removed, to allow access to a lock ring 108. To remove the tube 92, the lock ring 108 on a front part 110 of the ferrule which projects through the fitting, must be expanded and removed from a groove in the ferrule front part. Then the fitting and tube can be removed from the ferrule, by pulling the fitting 20 forwardly off the front part 110 of the ferrule 16 and then pulling the tube 92 forwardly off the front part 110 of the ferrule.

Thus, the invention provides anti-theft apparatus for resisting the removal of a fuel dispensing nozzle, which does not add substantially to the diameter of the nozzle and hose assembly and avoids substantial projections thereat, and which is of low cost and avoids the creation of a sloppy appearance and feel to the assembly. The apparatus includes a tube having an inside large enough to fit around the ferrule at the front end of the hose and around the nut portion of a fitting that is rotatably mounted on the ferrule and which can screw into the rear of the nozzle. A plurality of spacers in the form of segments of a hollow cylinder, preferably two of them, are installed between the ferrule and the inside of the tube. The spacers have an outside diameter substantially equal to the inside diameter of the tube portion that surrounds the ferrule and have an inside diameter substantially equal to the inside diameter of the ferrule. Each segment extends by no more than 180° to allow it to be easily installed. The tube has a plurality of threaded through holes which receive set screws that screw into the tube holes. The set screws have inner ends that press against the outside of the spacers, to press the spacers firmly against the outside of the ferrule. A quantity of sealing or bonding material such as silicone can fill the sockets of socket type set screws, to further delay thieves. Where a valve connects the rear of the nozzle to the front of the fitting, a tubular member of greater diameter than the tube can be used, which surrounds the tube and which surround substantially the entire length of the valve and which is held by set screws to the outside of the tube.

Although particular embodiments of the invention have been described and illustrated herein, it is recognized that modifications and variations may readily occur to those skilled in the art, and consequently, it is intended that the claims be interpreted to cover such modifications and equivalents.

We claim:

1. Anti-theft apparatus for resisting the removal of a fuel dispensing nozzle from a hose wherein the hose has a front hose end, a ferrule with a substantially cylindrical outer surface mounted to the front hose end, and a fitting rotatably mounted on the ferrule and having a nut portion and a forwardly-projecting threaded end, and wherein nozzle removal is normally accomplished by unscrewing the fitting from the nozzle, comprising:

a tube having an inside diameter large enough to fit around said nut portion and around said ferrule and long enough to lie simultaneously around both of them;

a plurality of spacers, each comprising a segment of a hollow cylinder having an outside diameter substantially equal to the inside diameter of said tube at a location around said ferrule, and each having an inside diameter substantially equal to the outside diameter of said ferrule, each of said spacers extending by no more than 180° about the axis of the cylinder;

said tube having a plurality of threaded through holes;

a plurality of set screws which screw into said tube holes and which have inner ends that press against the outside of said spacers to press them firmly against said ferrule.

2. The apparatus described in claim 1 wherein said ferrule is commonly of either a first or second outside diameter, and said ferrule may have a first outside diameter or a second outside diameter which is larger than said first outside diameter; and wherein said spacers each have an inside diameter which is substantially equal to the outside diameter of a corresponding ferrule, and said spacers have an outside diameter which remains constant irrespective of the size of ferrule used.

3. The apparatus described in claim 1 wherein a valve lies between said nozzle and fitting, said valve having a body with an internally threaded rear end for threadably receiving said fitting threaded end, and having an externally threaded front end projection from said body for screwing into said nozzle, including:
   a tubular member having a length about equal to the length of said valve body plus the length of said tube;
   said tubular member having a plurality of threaded through holes located to lie about said tube;
   a plurality of set screws which screw into said tubular member holes and which have inner ends that press against the outside of said tube.

4. The combination of a dispensing nozzle and hose assembly, with an anti-theft apparatus for resisting theft of the nozzle, comprising:
   a dispensing nozzle with an internally threaded rear end;
   a hose assembly which includes a hose having a front end, a ferrule with a substantially cylindrical outer surface mounted on said hose front end, and a fitting rotatably mounted on said ferrule and having a nut portion and a forwardly-projecting threaded end which is threadably engageable with said nozzle rear end;
   a tube with a substantially cylindrical inside extending around said ferrule, said tube also extending about said nut portion of said fitting;
   at least two spacers lying in the space between said ferrule outer surface and said tube cylindrical inside surface, each spacer extending by no more than 180° about said ferrule outer surface and having outer and inner surfaces respectively matching said tube inside surface and said ferrule outer surface;
   said tube having a plurality of threaded holes;
   a plurality of set screws threadably received in said threaded holes of said tube and having inner ends pressing against said spacer outer surfaces to press said spacers firmly against said ferrule outer surface.

5. The combination described in claim 4 including:
   a valve having front and rear ends engaged respectively with said nozzle rear end and said fitting forwardly-projecting end;
   a tubular member which extends around said tube and said valve, said tubular member having a plurality of threaded holes about said tube;
   a second plurality of set screws screwed into said tubular member holes and having inner ends firmly engaged with the outside of said tube.

6. A method for guarding against the theft of a dispensing nozzle and hose assembly which includes a nozzle having an internally threaded rear end, a hose with a front end, a ferrule with a substantially cylindrical outer surface mounted on said hose front end, and a fitting rotatably mounted on the ferrule and having a nut portion and a forwardly-projecting threaded end engaged with said nozzle rear end, comprising:
   placing a tube with cylindrical inside and outside surfaces to lie around said ferrule and around said fitting nut portion, with the inside surface large enough to leave a space between it and said ferrule;
   inserting a pair of segments of a hollow cylinder in the space between said ferrule and tube;
   tightening a plurality of set screws that are threadably engaged with holes in said tube, so inner ends of the screws press the segments firmly against the ferrule outer surface.

7. Anti-theft apparatus for resisting the removal of a fuel dispensing nozzle from a hose wherein the hose has a front hose end, a ferrule with a substantially cylindrical outer surface mounted to the front hose end, a ferrule front shoulder, and a front part projecting forwardly of said front ferrule shoulder, and a fitting rotatably mounted on the ferrule with said fitting having a nut portion and a forwardly-projecting threaded end, and wherein nozzle removal is normally accomplished by unscrewing the fitting from the nozzle, comprising:
   a tube having an inside diameter large enough to fit around said nut portion and around said ferrule and long enough to lie simultaneously around both of them;
   said tube having an inwardly projecting flange forming a rearwardly-facing shoulder that abuts said ferrule front shoulder to resist rearward tube movement, said tube forming a forwardly-facing shoulder that abuts said fitting to resist forward tube movement.

* * * * *